No. 814,779. PATENTED MAR. 13, 1906.
C. W. GRAHAM.
METHOD OF SOLDERING.
APPLICATION FILED JUNE 11, 1903.
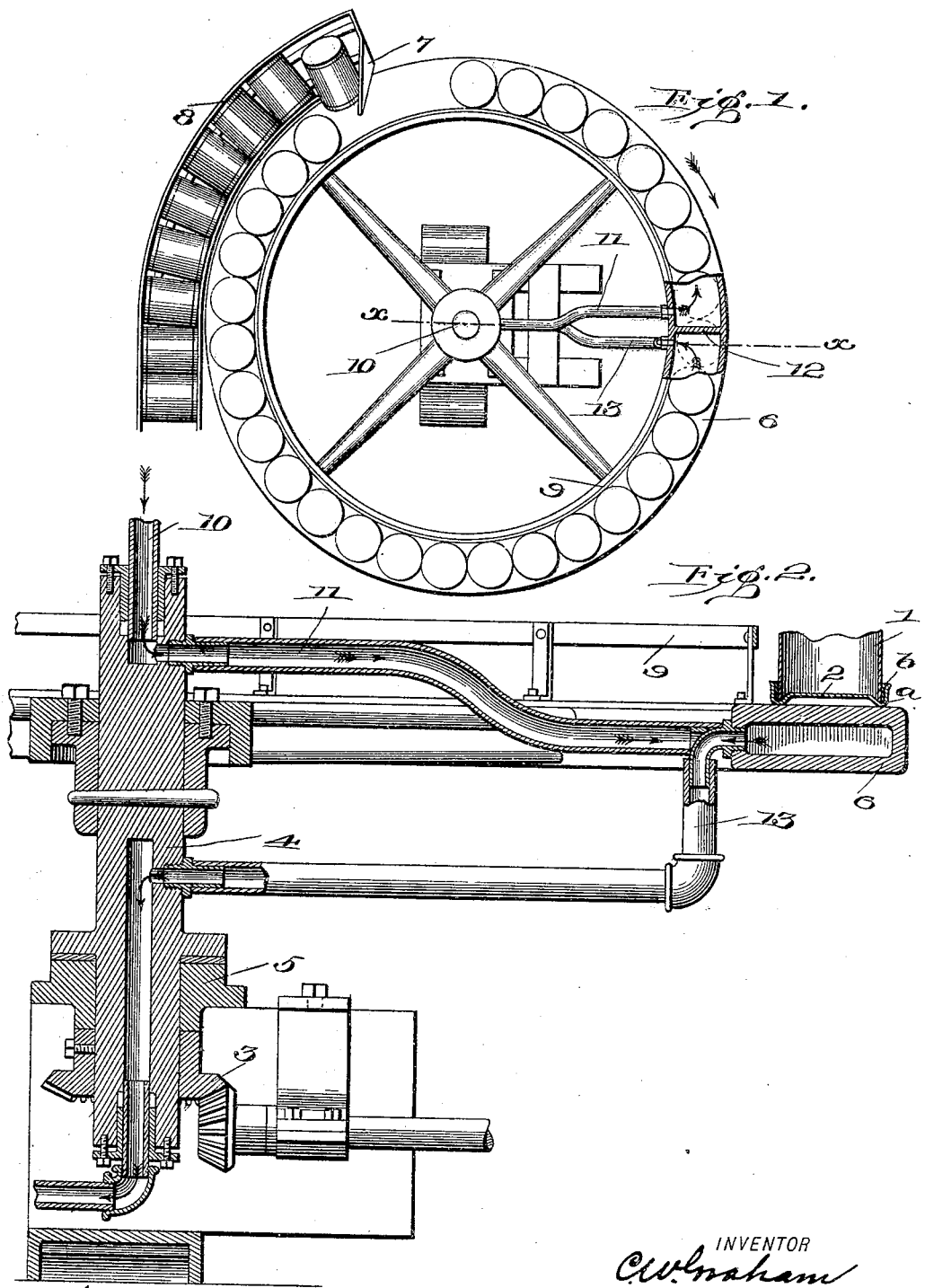
INVENTOR
C. W. Graham
BY
Duell McGrath & Warfield
ATTORNEYS

UNITED STATES PATENT OFFICE.

CHARLES W. GRAHAM, OF ROME, NEW YORK, ASSIGNOR TO UTICA INDUSTRIAL COMPANY, OF ROME, NEW YORK, A CORPORATION OF NEW YORK.

METHOD OF SOLDERING.

No. 814,779.     Specification of Letters Patent.     Patented March 13, 1906.

Application filed June 11, 1903. Serial No. 160,975.

*To all whom it may concern:*

Be it known that I, CHARLES W. GRAHAM, residing at Rome, in the county of Oneida and State of New York, have invented certain new and useful Improvements in Methods of Soldering, of which the following is a full, clear, and exact description, such as will enable others skilled in the art to which it appertains to make and use the same.

The invention relates to a method for setting or solidifying solder at the joints of tin cans and similar articles. Its object is to provide a new and improved method whereby the solder may be set more efficiently and by which a more permanent joint be obtained.

The invention consists in the method hereinafter described and claimed.

In the accompanying drawings, which illustrate a machine for carrying my method into effect and which is shown merely as a preferred way of practicing the method and to aid in the understanding thereof, Figure 1 is a top plan view, partly broken away, of a rotary turn-table by which the cans may be carried while subjected to the influence of a cooling medium. Fig. 2 is a vertical section, partially broken away, on the line X X of Fig. 1.

Similar reference characters refer to similar parts throughout both the views.

Referring first to the turn-table shown, the cans are to be fed thereto with the solder in a liquid or semiliquid condition at the joint between the body 1 and the head 2 of the can, which forms, in effect, a pocket, as shown in the sectional view of Fig. 2. The turn-table is adapted to be rotated by gear 3 driven in any suitable manner and attached to the hub 4 of the table, which hub is journaled in a suitable bearing 5. The table comprises in the present embodiment a frame of spider or web form, which carries a hollow annular ring or ledge 6, upon which the cans are placed and by which they are carried around as the table is rotated until they are removed after any desired interval and in any suitable manner, as by a deflector 7, which turns them to the mouth of a chute 8. A rail 9 may be provided for holding the cans in position on the ledge. An inlet-pipe 10 for cold water or any desired cooling medium communicates with a connecting-pipe 11, which opens into the conduit formed by the hollow construction of the ledge 6 at one side of a barrier or deflector 12. An outlet-pipe 13 takes out adjacent to the barrier on the other side.

Upon leading a current of cold water or other cooling medium into the conduit it will follow the direction indicated by the arrows and be caused to traverse practically the entire circuit of the ledge owing to the position of the inlet and outlet pipes and the barrier. Thus a can placed on the turn-table will during the rotation thereof be subjected to the influence of the cooling medium acting through the material of which the upper wall of the ledge 6, upon which the can rests, is formed. The cooling and solidifying effect of such medium will then be first exerted upon that part of the solder in the joint, as at *a*, at the angle formed at the joint where the head is flanged over—that is, at the point where the end of the can-body meets the head thereof. The effect of the cooling medium will then be progressively exerted along the joint to the point where it is broken by the termination of the flange, as at the point *b*. In some former processes the solder has been set at the joint either as a whole or by a cooling medium, the effect of which is exerted upon a part only of the desired surface by a cold-air blast directed against chains upon which a line of cans is carried. In either of these cases the solder does not set evenly, and when, as often happens, the solder at a point of the joint nearer the center of the cans or nearer the break of the joint is exposed to the effect of the cooling medium and sets before the solder in that part of the joint near the angle between the main head-plate and the flange has become set, air-bubbles will be formed by the air caught in the solder which will not then have a chance to work out to the break in the joint, and an imperfect joint result, because of which the efficiency of the can as a preserving-receptacle will be lessened, if not totally destroyed. The method carried out in accordance with my present invention, whether by the use of the device illustrated or in many other ways which would be readily suggested, differs radically from such methods and others which have been heretofore proposed in that it provides, as set forth, for applying the cooling medium to the solder progressively from the lowest part of the joint, or that part which is covered by the flange, toward the longitudinal center of the can or toward the point at which the joint is broken, and at which point the solder is open to the air.

Practical tests have proved the efficiency of the method outlined, and it is not necessary that I should further elaborate the theory of operation in accordance with which the beneficial results set forth are obtained. It is my belief, however, that the efficiency of the method of progressively setting the solder in this way from the concealed part of the joint to the point at which it is open to the air is caused by the fact that air-bubbles which may be imprisoned in the solder applied to the joint are squeezed out by the progressive solidification, so that no air-bubbles remain to endanger the life of the joint, while if this cooling medium is applied to a part only of the joint or from the break of the joint along the flange or to all parts of the joint at once there would be likely to be a solidification of what in the drawings is the upper part of the joint before the solder below is solidified, thus rendering it likely that air-bubbles would be caught and held within the joint. The same theory would apply to the formation of soft spots and holes in the joint, whether filled with air or vacua. Where the cooling medium is applied to a point corresponding to the top of the joint, as shown in the drawings, or to all parts of the joints at once, the contraction caused by the setting of the solder will work in various directions throughout the joint and will tend to leave holes which would immediately or eventually destroy its usefulness. Where, however, the solidification is progressive from the bottom or concealed part of the joint upward or outward the initial contraction of the solder draws in the liquid solder, thereby filling up any holes which might be caused by the contraction and insuring a solid closely-packed joint. Looking at it from this viewpoint the essential feature is that the effects of the contraction should all be exerted in one direction rather than, as in the case of methods heretofore proposed, being exerted in various directions throughout the mass, which would tend to pull the particles apart instead of setting them together into a compact body. While this may not be the correct theory of the method, the principle of the invention and the mode of carrying it out will be sufficiently clear from the description given, and I do not intend to limit myself to any technical theory of operation.

It will be obvious that this method can be carried out in a great number of ways and may be applied for setting solder or various other packing substances at the joint of a great variety of articles in which it is desired to set or solidify such packing; and by the word "solder," as used throughout the following claims, is meant any substance adapted upon being congealed to act as a joining medium between two members.

The means illustrated for practicing my method are similar to the means shown in a companion application of even date, wherein they are claimed as such.

Having described my invention, what I claim as new, and desire to secure by Letters Patent, is—

1. The method of setting solder at a joint comprising a solder-holding pocket, which consists in withdrawing heat from all of the solder within said pocket through the closed end of said pocket thereby progressively solidifying the solder of the joint from the concealed to the exposed portions thereof.

2. The method of setting solder between a plurality of overlapping members, which overlapping members form a joint closed at one end, which consists in withdrawing heat from the entire joint by the application of a cooling member to one of said overlapping members of said joint at the closed end thereof, on a line opposite the edge of another of said overlapping members, and thereby progressively solidifying the solder of the joint from the concealed to the exposed portions thereof.

3. The method of setting solder between two members, a part of one of which is flanged about the edge of the other, forming a joint with one end thereof closed, which consists in withdrawing heat from all of said solder through a part thereof remote from its exposed surfaces and thereby progressively lowering the temperature of and solidifying the joint from its concealed toward its exposed portions.

4. The method of setting solder between a can-head provided with a flange and an annular depression and a can-body the edge of which rests within said flange and in said annular depression, which consists in withdrawing heat from the portion of the solder within said annular depression by application of a cooling member to the outer surfaces thereof remote from the exposed portions of the joint and thereby progressively reducing the temperature of and solidifying the solder from its concealed portion within said depression toward its exposed portion adjacent the upper edge of said flange.

In testimony whereof I affix my signature in the presence of two witnesses.

CHARLES W. GRAHAM.

Witnesses:
 HENRY J. COOKINHAM,
 SANFORD F. SHERMAN.